United States Patent
Kuzuta

(10) Patent No.: US 6,539,044 B1
(45) Date of Patent: Mar. 25, 2003

(54) SOLID STATE LASER DEVICE WITH REPLACEABLE SEMICONDUCTOR LASER

(75) Inventor: Nobuyuki Kuzuta, Kanagawa (JP)

(73) Assignee: Shimadzu Corporation, Kyoto (JP)

( * ) Notice: Subject to any disclaimer, the term of this patent is extended or adjusted under 35 U.S.C. 154(b) by 542 days.

(21) Appl. No.: 08/919,795

(22) Filed: Aug. 29, 1997

(30) Foreign Application Priority Data

Aug. 30, 1996 (JP) .............................................. 8-230651

(51) Int. Cl.$^7$ .............................................. H01S 3/0941
(52) U.S. Cl. .............................. 372/75; 372/69; 372/70
(58) Field of Search ................................ 372/69–71, 75

(56) References Cited

U.S. PATENT DOCUMENTS

| | | | | |
|---|---|---|---|---|
| 4,730,335 A | * | 3/1988 | Clark et al. ................ | 372/75 X |
| 4,979,180 A | * | 12/1990 | Muncheryan ............. | 372/75 X |
| 5,012,481 A | * | 4/1991 | Casteleiro ................. | 372/69 X |
| 5,278,860 A | * | 1/1994 | August, Jr. et al. ........... | 372/70 |
| 5,394,427 A | * | 2/1995 | McMinn et al. ............... | 372/70 |
| 5,805,625 A | * | 9/1998 | Langner et al. ............... | 372/35 |

* cited by examiner

Primary Examiner—John D. Lee
(74) Attorney, Agent, or Firm—Rader, Fishman & Grauer PLLC

(57) ABSTRACT

A solid state laser device according to the present invention comprises a pumping semiconductor laser 11 for oscillating a laser light as a pumping light, a collimator lens 12 for leading the laser light to parallel rays, a focusing lens 21 for focusing the laser light led to the parallel rays by the collimator lens 12 and leading the focused laser light to a laser medium 22, the laser medium 22 for absorbing the laser light and outputting a spontaneous emission light and an optical resonator 25 for confining the spontaneous emission light to make the laser light oscillated by an induced emission, wherein the solid state laser device includes a housing 10 for storing the a pumping semiconductor laser 11 and the collimator lens 12 in a state of positioning them on the same optical axis 16, and a housing 20 for housing the focusing lens 21, the laser medium 22 and the optical resonator 25 in a state of positioning them on the same optical axis, and the housings are detachable.

4 Claims, 2 Drawing Sheets

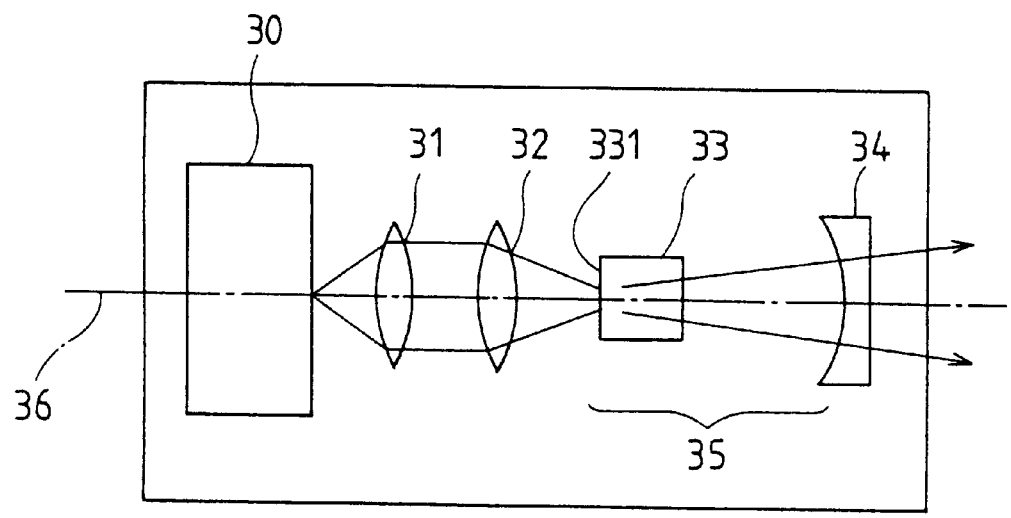

SOLID STATE LASER DEVICE WITH REPLACEABLE SEMICONDUCTOR LASER

BACKGROUND OF THE INVENTION

1. Field of the Invention

The present invention relates to a solid state laser device utilizing a semiconductor laser as a light source for exciting a laser medium.

2. Description of the Prior Art

As a conventional solid state laser device, FIG. 3 illustrates a structure of a solid state laser device using an end-pumping system for constructing a resonator comprising an end surface of a laser medium and a mirror.

The solid state laser device comprises a pumping semiconductor laser 30 for oscillating a laser light as an excitation light, a collimator lens 31 for leading the laser light oscillated from the pumping semiconductor laser 30 to parallel rays, and a focusing lens 32 for focusing the laser light output via the collimator lens 31 and leading the focused laser light to a laser medium 33. The focusing lens 32 has a structure wherein a focus of the each parallel rays is positioned on a surface of the laser medium 33 or a slightly inner point thereof. Moreover, the solid state laser device includes the laser medium 33 for absorbing the laser light focused by the focusing lens 32, the laser medium 33 is composed of an Nd-YAG crystal in which a YAG (Yttrium Alminum Garnet) crystal is doped with Nd. An output mirror 34 positioned opposite to the laser medium 33 constructs an incident surface of the laser light emitted inductively in the laser medium 33, and an optical resonator 35 consists of the output mirror 34 and an end surface 331 of the laser medium 33. By the optical resonator 35, the laser light is confined between the laser medium and the output mirror 34, to be amplified by resonating. A part of the amplified light is output via the output mirror 34. In such a solid state laser device, the output surface of the laser light of the pumping semiconductor laser 30 is a reference plane, other component parts are positioned on an optical axis 36, and alignments are performed as a whole.

In the solid state laser device having the above structure, a life of the pumping semiconductor laser 30 is the shortest among those of all component parts which the solid state laser device comprises, such as the lens, the mirror, and the laser medium. Owing to an electrical surge, an excess current and a static electricity, there is the highest possibility wherein a trouble happens, whereby the pumping semiconductor laser 30 is often exchanged.

However, in the structure of the above solid state laser device, in case of exchanging the pumping semiconductor laser 30, the following steps are required: all component parts of the solid state laser device are disassembled into all pieces, the pumping semiconductor laser 30 is exchanged into new one before a laser light outgoing radiation surface of the pumping semiconductor laser 30 is utilized as the reference plane, and the all component parts, that is, the collimator lens 31, the focusing lens 32, the laser medium 33 and the output mirror 34 in order are aligned with the result that it takes much labor and long time to complete such a work. Consequently, it is difficult to complete an assembling operation because it takes a further long time to assemble the device with the number of component parts is increased.

DISCLOSURE OF THE INVENTION

The object of the present invention is to provide a solid state laser device wherein, in case that the pumping semiconductor laser is exchanged, the exchange, assembly and adjustment operations can be easily and efficiently performed.

In order to achieve the above object, the solid state laser device according to the present invention comprises a laser semiconductor for oscillating a laser light as a pumping light, an optical system for leading the laser light to parallel rays, a focusing lens for focusing the laser light led to the parallel rays by means of the optical system and leading the focused laser light to a laser medium, the laser medium for absorbing the laser light and outputting a spontaneous emission light and an optical resonator for confining the spontaneous emission light to make the laser light oscillated by means of an induced emission, wherein the solid state laser device includes a first housing for storing the laser semiconductor and the optical system wherein they are positioned on the same optical axis, and a second housing for storing the focusing lens, the laser medium and the optical resonator wherein they are positioned on the same optical axis, and the solid state laser device is characterized in that the housings are detachable.

Moreover, the second housing may be structurally provided with an output lens for outputting the laser light output by the optical resonator, as the parallel rays.

In addition, the optical resonator may structurally include an end surface of the laser medium and a partial transmittable mirror positioned opposite to the end surface.

Furthermore, as a concrete embodiment of the present invention, a wavelength converting element is disposed between the laser medium and the partial transmittable mirror included by the optical resonator, thereby allowing a structure of a wavelength-converting-type solid state laser device.

As mentioned above, the solid state laser device according to the present invention has a structure wherein the first and the second housings are only disposed at each predetermined position, thereby keeping a movable installation state. Moreover, in case of performing a maintenance such as exchanging the component parts disposed inside the housings, the exchange is operated in each unit, and it is proper simply to align the positions of the component parts inside the each housing. Consequently, it is not necessary to align the positions of the all component parts as a whole of the solid state laser device.

In other words, the each housing can be aligned so as to be served most efficiently in operation, excitation beams emitted from the first housing to the second housing are parallel by the collimator lens, whereby meeting each optical axis between two housings requires no high efficiency. For example, even if the optical axes are slightly shifted each other, or they intersect aslant, a tolerance of the alignment is wide with the result that it is easy to install the each housing.

BRIEF DESCRIPTION OF THE DRAWINGS

FIG. 3 is a diagram illustrating a structure of a conventional solid state laser device.

DETAILED DESCRIPTION OF THE PREFERRED EMBODIMENTS

Figure 1:
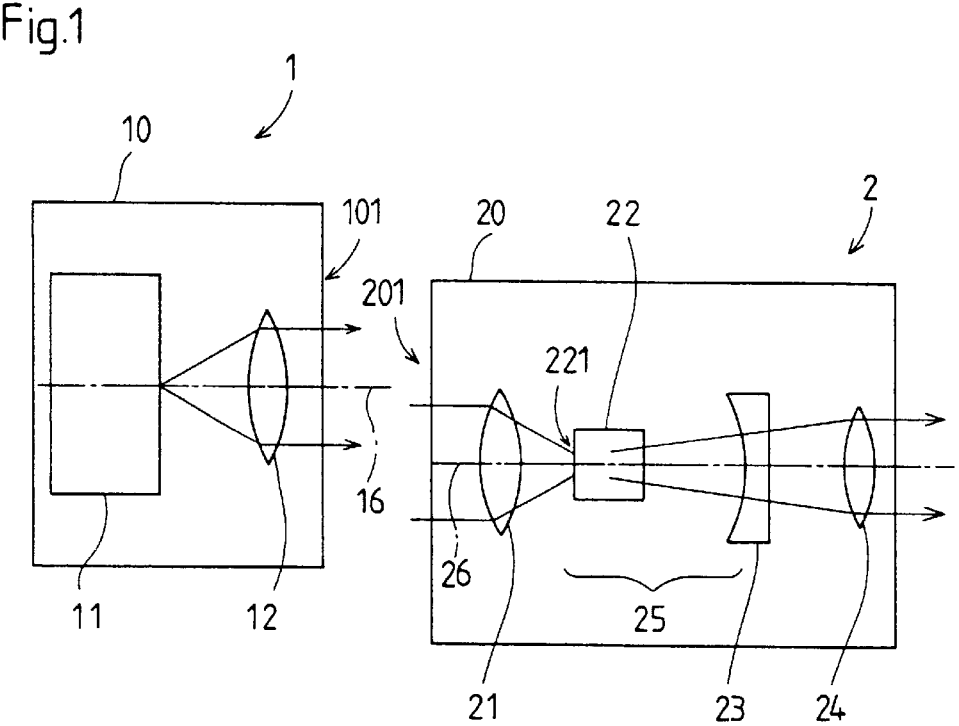
FIG. 1 is a diagram illustrating a structure of a solid state laser device according to an embodiment of the present invention.

Referring now to the drawings, preferred embodiments of the present invention are described in detail below.

FIG. 1 is a diagram illustrating a structure of an embodiment of the present invention.

The solid state laser device according to the present invention comprises two units, that is, a semiconductor laser unit 1 and a resonator unit 2, and the two units 1 and 2 are detachable, and they can be freely disposed or removed.

First, the semiconductor laser unit 1 structurally includes a housing 10 for storing a pumping semiconductor laser 11 for oscillating a laser light as a pumping light, and a collimator lens 12 for leading the laser light to parallel rays in a state of positioning them on the same optical axis 16.

On the other hand, the resonator unit 2 includes a focusing lens 21 for focusing parallel laser beams by the collimator lens 12 so that a focus of the parallel beams may be positioned on a surface or a slightly inner point of the laser medium 22, the laser medium 22, a reflecting resonator mirror 23 and an output lens 24 for leading a partial laser light transmitting the reflecting resonator mirror 23 to parallel rays, wherein they are positioned on the same optical axis 26, and they are structurally stored inside a housing 20. Inside the housing 20, a spontaneous emission light is output from the laser medium owing to the excitation of the laser medium 22. The optical resonator 25 comprises a laser medium end surface 221 and a mirror surface of the reflecting resonator mirror 23, and confines the spontaneous emission light between the laser medium end surface 221 and the reflecting resonator mirror 5, thereby oscillating the laser beams owing to the induced emission.

In addition, the housing 10 and the housing 20 are respectively provided with apertures 101 and 201 for enabling the laser light to be transmitted. In case of installing the solid state laser device, the apertures 101 and 201 are opposed to each other.

A method of assembling the semiconductor laser unit and the resonator unit 2 is described as below.

A position of the collimator lens 12 based on the pumping semiconductor laser 11 is decided in a state of aligning them so that the excitation light emitted from the pumping semiconductor laser 11 may be parallel rays, and a semiconductor laser unit 1 is formed by storing them inside the housing 10.

Next, the parallel rays emitted from the semiconductor laser unit 1 are focused by the focusing lens 21, before the focusing lens 21 and the laser medium 22 are aligned so that the focused pumping light may be focused on a surface or a slightly inner point of the laser medium 22, and the reflecting resonator mirror 23 is aligned so that an output may be the greatest. Furthermore, the output lens 24 is aligned so that output beams emitted from the reflecting resonator mirror 23 may be parallel rays, and in such a condition, they are stored inside the housing 20, thus forming the resonator unit 2.

After assembling the semiconductor laser unit 1 and the resonator unit 2 respectively, they are disposed on a common base, an alignment is performed between the semiconductor laser unit 1 and the resonator unit 2, and they are disposed so that the output may be the greatest, thereby completing the assembly.

In assembling the semiconductor laser unit 1 and the resonator unit 2, it is not necessary to manufacture each pair of units, it is allowed to manufacture one of each pair in large quantities. In this case, for example, a prefabricated semiconductor laser unit 1 is employed as a reference, and a large number of the resonator units 2 are manufactured in succession by the above method or the resonator unit 2 is employed as a reference, and a large number of the semiconductor laser units 1 are manufactured in succession by the above method.

In an alignment between the semiconductor laser unit 1 and the resonator unit 2, it is the most preferable that an optical axis 16 of the semiconductor laser unit 1 is agreed with the an optical axis 26 of the resonator unit 2. However, the units 1 and 2 are structurally joined by the parallel pencil of rays having A large diameters, whereby a tolerance of the alignment is wide. For example, even if the optical axis 16 and the optical axis 26 intersect slightly aslant, the output beams as the solid state laser device are guaranteed to a certain degree, whereby the two units can be easily combined. Consequently, as mentioned above, even if the both units are reproduced by employing the specific units as the respective references, the units can facilitate constructing the solid state laser device.

In addition, in case that the pumping semiconductor laser 11 is bad condition, a whole of the semiconductor laser unit 1 may be exchanged and the pumping semiconductor laser 11 and the collimator lens 12 may be aligned after exchanging the pumping semiconductor laser 11. The semiconductor laser unit 1 and the resonator unit 2 are reinstalled, thereby facilitate forming the solid state laser unit.

A motion of the solid state laser device according to the present invention having the above structure is described as below.

The laser light emitted from the pumping semiconductor laser 11 inside the semiconductor unit 1 is led to the parallel rays by the collimator lens 12, the parallel rays are incident by the focusing lens 21 via the aperture 101 of the semiconductor unit 1 and the aperture 201 of the resonator unit 2, so that a focus of the each parallel rays may be positioned on a surface of the laser medium 22 or a slightly inner point of the laser medium 22.

By the incident laser beams, the laser medium 22 is pumped to emit the light having a predetermined wavelength. The light is confined by the optical resonator constructed between the end surface 221 where the laser beams of the laser medium 22 are incident, and the mirror surface where the laser beams of the reflecting resonator mirror 23 are incident or reflected, thereby being amplified, with the result that a part thereof is output from the reflecting resonator mirror 23 whereby the output lens 24 makes the beams of the light parallel to output the beams to the outside of the device.

Figure 2:
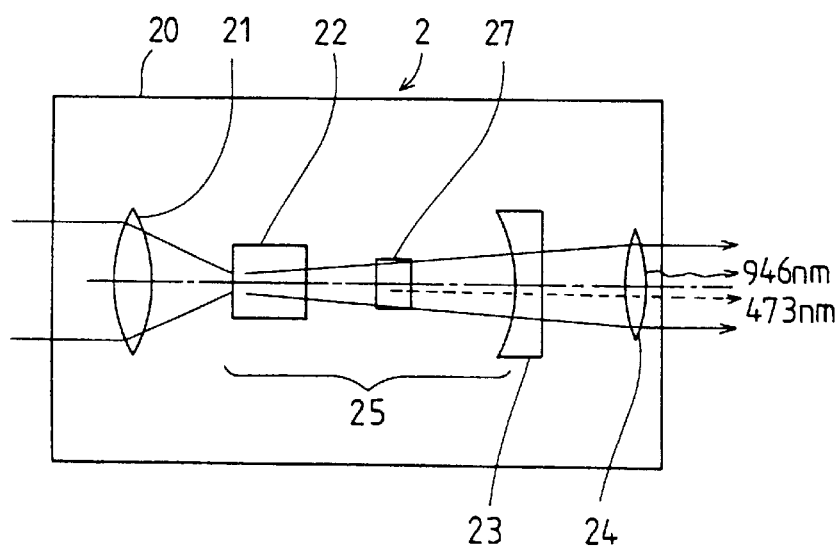
FIG. 2 is a diagram illustrating a structure of a resonator unit of a solid state laser device according to another embodiment of the present invention.

FIG. 2 is a diagram illustrating a structure of another embodiment of the present invention.

In the embodiment, in addition to a structure of the embodiment shown in FIG. 1, a non-linear optical crystal 27 such as $KN(K_3NbO_4)$ is structurally disposed inside the optical resonator 25. In this case, the embodiment is applied to a wavelength conversion laser for converting the light of 946 nm into the solid state laser light of 473 nm in wavelength to be output.

As well as the above embodiments, the present invention may be applied to a structure, wherein, at the stage subsequent to the output lens 24, an optical filter for transmitting only the laser diode light, a half mirror or the like is disposed, thereby taking a part of the output light out and incorporating an optical system for detecting a light intensity by a photodiode.

What is claimed is:

1. A solid state laser device comprising:
    a laser semiconductor for oscillating a laser light as a pumping light,
    a collimator lens for leading the laser light to parallel rays,
    a focusing lens for focusing the laser light led to the parallel rays by the collimator lens and leading the focused laser light to a laser medium, the laser medium for absorbing the laser light and outputting a spontaneous emission light, and an optical resonator for confining the spontaneous emission light to make the laser light oscillated by an induced emission, wherein the solid state laser device includes a first housing for storing the laser semiconductor and the collimator lens in a state of positioning them on the same optical axis, and a second housing for storing the focusing lens, the laser medium and the optical resonator in a state of positioning them on the same optical axis, and the housings are detachable.

2. A solid state laser device according to claim 1, wherein the second housing is provided with an output lens for outputting the laser light output by the optical resonator as the parallel rays.

3. A solid state laser device according to claim 1 or 2, wherein the optical resonator includes an end surface the laser medium and a partial transmittable mirror positioned opposite to the end surface.

4. A solid state laser device according to claim 3, wherein a wave length converting element is disposed between the laser medium and the partial transmittable mirror.

* * * * *